No. 724,553. PATENTED APR. 7, 1903.
C. E. DAVIS.
PROCESS OF PRESERVING PERISHABLE FOOD PRODUCTS.
APPLICATION FILED FEB. 9, 1901.
NO MODEL.
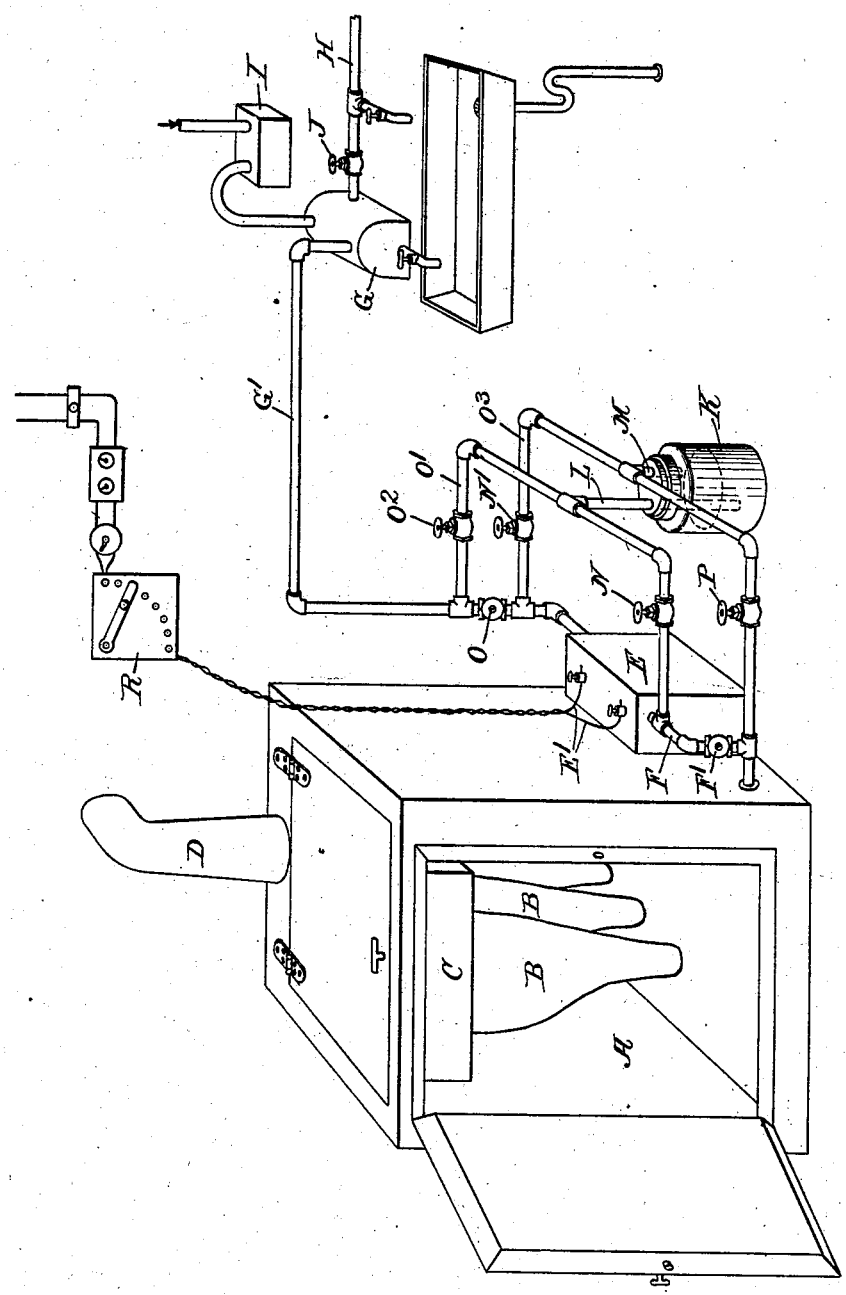
Witnesses.
Edward T. Wray.
Howard L. Kraft.
Inventor.
Charles E. Davis
by Parker Carter
his Atty's.

UNITED STATES PATENT OFFICE.

CHARLES E. DAVIS, OF CHICAGO, ILLINOIS, ASSIGNOR TO ELMER A. SPERRY, OF CLEVELAND, OHIO.

PROCESS OF PRESERVING PERISHABLE FOOD PRODUCTS.

SPECIFICATION forming part of Letters Patent No. 724,553, dated April 7, 1903.

Application filed February 9, 1901. Serial No. 46,592. (No specimens.)

*To all whom it may concern:*

Be it known that I, CHARLES E. DAVIS, a citizen of the United States, residing at Chicago, in the county of Cook and State of Illinois, have invented a certain new and useful Improvement in Processes for Preservation of Perishable Food Products, of which the following is a specification.

My invention relates to a process of preserving perishable products.

Broadly speaking, it consists in exposing such products when within a suitable inclosure to the action of a group of gases previously treated electrostatically; or, more specifically, it may be said to consist in exposing such products within a suitable inclosure to atmospheric air which has been just previously treated electrostatically or to a current of atmospheric air, the whole of which after being treated electrostatically has been introduced into said inclosure. The gases and the air may be subjected to other conditions or other treatment as incidental to the principal treatment.

A means for carrying out my process is illustrated in the accompanying drawing, wherein—

A represents an inclosure, as, for example, a refrigerator; B, the products in the same for treatment; C, the receptacle for the refrigerating material, and D the escape-flue.

E is what I will call an "electrolyzer" or device for electrolyzing the atmospheric air. E' E' are conductors leading thence to the rheostat R.

F is a pipe, leading from the electrolyzer to the refrigerator, controlled by the valve F'.

G is a compressor operated in this case by water from the water-main H, which is controlled by the valve J. By varying the temperature of the water supplied to the compressor such compressor may operate also as an air-temperature-varying device.

I (which may be charged with water or a filtering substance, or both, or, in the case of air too moist, with means for taking up such moisture) is a purifier, moistener, or drier for the atmospheric air, whence it passes into the compressor G, and G' is a pipe leading from the compressor G to the electrolyzer, being controlled by the valve O.

O' is a pipe leading from the pipe G' and controlled by the valves $O^2$ and N.

L is a connection from the pipe O' to the receptacle K. M is a like connection leading from the receptacle K to the pipe $O^3$, controlled by the valves P and N'. Thus it will be seen that the pipe O' is connected with the pipe G' above the valve O and with the pipe F above the valve F' and that the pipe $O^3$ is connected with the pipe G' below the valve O and with the pipe F below the valve F'. This drawing will be understood to be diagrammatic, as I have not attempted to illustrate very accurately the precise devices or forms of construction shown.

The atmospheric air may be purified in any manner in the device I or moistened therein, as the case may be. In the compressor G the air can be raised or lowered in temperature, as may be desired. The receptacle K may take the form of a vaporizer, generator, or drier, with the induction L and eduction M. This generator has a twofold connection with the other ducts for the purpose of leading the fluids therein generated or dried either through the electrolyzer or the electrolyzed fluids through the receptacle, whereby their properties may be utilized in whole or part to produce secondary products of great penetrating, sweetening, and preserving power, and in addition to which they may also be made to embody covering qualities, as hereinafter described. These results are secured by manipulations of the group of six valves, as follows: By closing valves N O P and opening the remaining ones of the group the path of the vapors to the electrolyzer will include the generator K, whereas by opening these valves and closing the others the electrolyzed gases pass the generator on their way to the inclosure A.

The result accomplished or office performed by the so-called "generator" may be described as follows: Turpentine in suitable quantities may be introduced in any manner into this generator. Fusel-oil may also be used and perhaps other chemical agents for the purpose of adding to the curative qualities of the electrolyzed air and the products produced by my process or for the purpose of coating the articles to be treated, as hereinafter described, and such treatment may take place before or after the passage of the air through the electrolyzer and should be of course varied and moderated according to the requirements of the articles to be treated.

I will now more generally describe the process. It has long been thought that foods and meats can be preserved and reclaimed from decomposition by placing them in an air-tight chamber or receptacle, exhausting the air therefrom, and replacing the same by ozone, to the action of which gas they were then left for some time. I have made a discovery that with proper gases, and especially those produced by intense static electrolyzation, and especially where they can be freshly and quickly applied to the substances to be treated while they are yet in an abnormally active and nascent state, such foodstuffs and organic substances generally may be not only preserved, but that overripe products may even be reclaimed, and it will be noted that the process may go forward in an open box or room or inclosure, with no attempt to exclude the atmosphere and into which workmen may go from time to time for the purpose of handling, withdrawing, or adding to the stock.

The allotropic modification of oxygen known as "ozone" is not the active element, or, at least, is only one of a group of important active elements present and upon which the results of my particular process of preservation depend.

The most recent experimenters agree with the observations I have made that from the electrolyzation of the atmospheric air is developed a group of high oxidizers, only a small portion of the mixture being ozone. These compounds are the lower oxygen-nitrogen compounds, and when the air admitted to the electrolyzer has been previously moistened or contains moisture to these are added the products of hydroxyl and the lower and more unstable hydrogen-nitrogen compounds. To illustrate how other ingredients than ozone really constitute the active agents in carrying out my process, I need only to point out that the usual quantity of ozone that is produced by my apparatus is less than three-tenths per cent., while the best authorities agree with my observations that practically all of the oxygen component of the atmosphere passing the electrolyzer has without doubt been once broken up and assumed the triatomic $O_3$ structure, but through the law of disassociation has dropped back into the diatomic state known as "oxygen," but which I believe to possess peculiar preservative qualities within the scope of the present invention. This fact has an important bearing on the process constituting the present invention. Attention is called to the result of this particular portion of the phenomenon, inasmuch as it is doubtless through the action of the third atom $O_3$ that the important oxidizing and chemicalizing agents which are looked upon as performing the work of preserving are brought into existence. Thus it will be seen that the high oxigents and chemicalizers have been produced in electrolyzing air by an agent which in performing the work of breaking up the other molecules has yielded up much of its latent energy and practically disappeared, inasmuch as only an insignificant amount of ozone is found to issue from the apparatus.

I have always found that for the best results the apparatus should be located close to the inclosure or receptacle, so that the products may be immediately attacked and operated upon by electrolyzed chemicalizing agents immediately after they are so electrolyzed. The great difference in the intensity of action of the gases immediately upon issuing from the electrolyzer and those that have stood or traveled a great distance leads me to believe that the molecules of the oxygen component of the group which have been freshly produced by the disassociation of ozone have peculiar preservative qualities. Especially is this true when they are allowed to attack the substance at once upon having been electrolyzed. This product I denominate as "electrolyzed" oxygen. I have also found that the preserving process will go on even if the products are submerged within a liquid and the chemicalizing agents are permitted to regurgitate through such liquid. I have also found that the process is more rapidly performed and less electrical energy required when the temperatures are kept low.

By the arrangement indicated the electrolyzed air is carried, as it were, in a current or continuously through or among or past the articles to be treated.

That portion of my process which is effected in connection with the generator or receptacle K may be described as follows: It is well known that ozone readily attacks and breaks up turpentine. The small amount of ozone present in my group of electrolyzed preservatives may thus be utilized in whole or in part to produce the vapors of turpentine or a new chemical compound produced by treating turpentine with the nascent gases, which when commingled with the other members of the group is found to produce remarkable effects upon organic substances, especially so in cases where decomposition has set in or on animal tissues where bacteria are at work. The turpentine vapors or compounds are found to again break up on contact with such substances or tissues, especially when moist, forming at least two intermediate products—hydroxyl, which, as is well known, is a powerful oxidant and immediately destroys or helps to destroy the lower organisms and forms of life at work producing decomposition, thus perfectly sweetening the product, which it then proceeds to safeguard in a way that is entirely novel and extremely effective. The other substance produced is a sort of primary resin, this being precipitated in an infinitely thin film, thus delicately covering the tissues with a varnish-like coating impervious to the air and after the tissues have been sufficiently impregnated and sweetened by the other members of the electrolyzed group and the associated compounds. The combined action of this novel group of fumigants is found to yield a degree of curing preservatives of food products and organic substances never before attained.

To illustrate the operation of this process, I will state an extreme case, as follows: A piece of overripe meat was allowed to further decompose until it became excessively offensive. Upon subjecting this meat in an inclosure to the flow of freshly-electrolyzed atmospheric air, with the electrolyzer situated two feet distant from the inclosure and with an expenditure of one-fourth kilowatt in the electrolyzer, in two hours the meat was found to be entirely restored and to every appearance perfectly fresh. Furthermore, it was found to be chemicalized to a certain extent or impregnated with the electrolyzed products, so that it was possible to expose it to the air at ordinary temperatures for a considerable period of time before decomposition again made its appearance.

It will thus be seen that a practical process of preservation of perishable products and even of reclaiming and restoring such products has been devised which may be utilized to work a remarkable saving and practically arrest ordinary waste through decay, which at present is known to be enormous.

This process, as has been seen, may be readily applied to existing chilling rooms, chambers, or inclosures and not interfering with their normal use nor the usual manipulations of the contents. Furthermore, the process is extremely inexpensive as to operation and maintenance, deriving the small amount of energy required for its operation from the common source of electrical distribution usually met with in every hamlet, and also utilizing the ordinary water-supply to furnish such additional power as is required or as may become necessary to maintain a forced circulation where such circulation is desirable. It will also be seen that the process is equally applicable or will operate with equal facility on land and sea, in storage-chambers, chilling-warehouses, or on shipboard.

For sweetening substances and for more perfectly curing and sweetening ripe products I may associate certain active vapors or gaseous compounds with the group of electrolyzed gases.

I have not thought it necessary to make any further showing of the electrolyzer; but any of the well-known forms can be used—as, for example, the Siemens, which consists of concentric or parallel plates of high insulation, such as glass coated with a conducting material, such as tin-foil, or silent-discharge static effect. With this a step-up transformer may be used, if desired. The generator is of any ordinary form, and in the arrangement shown the material out of which the additional gas is to be formed is introduced into the circulating system and the gases pass the liquid by bubbling up through it, both of the entering tubes passing through the cork of the bottle.

While the products to be treated must be placed in a confined chamber in order that they may be effectively subjected to the action of the electrolyzed air, it is desirable or necessary to provide this chamber with vents, the waste gases escaping through these vents.

I claim—

1. The process of treating perishable products which consists in placing them in a confined chamber, electrolyzing air, and bringing said electrolyzed air into contact with said perishable products while the gases in the electrolyzed air are in an active and nascent state, as set forth.

2. The process of treating perishable products which consists in placing them in a confined chamber, electrolyzing air, and bringing a continuous current of said electrolyzed air into said chamber and into contact with said perishable products while the gases in the electrolyzed air are in an active and nascent state, as set forth.

3. The process of treating perishable products which consists in placing them in a confined chamber, electrolyzing air, and bringing said electrolyzed air associated with preservative substances into contact with said perishable products while the gases in the electrolyzed air are in an active and nascent state, as set forth.

CHARLES E. DAVIS.

Witnesses:
HOMER L. KRAFT,
EDWARD T. WRAY.